US011856473B2

(12) United States Patent
McIntyre et al.

(10) Patent No.: US 11,856,473 B2
(45) Date of Patent: Dec. 26, 2023

(54) INTELLIGENT GEOFENCE PROVISIONING (71) Applicant: INTUIT INC., Mountain View, CA (US)

(72) Inventors: Nathan A. McIntyre, Meridian, ID (US); Devin Shively, Mountain View, CA (US); Joshua Andrew Yundt, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 402 days.

(21) Appl. No.: 17/306,045

(22) Filed: May 3, 2021

(65) Prior Publication Data

US 2021/0258723 A1 Aug. 19, 2021

Related U.S. Application Data

(63) Continuation of application No. 16/256,274, filed on Jan. 24, 2019, now Pat. No. 10,999,697.

(51) Int. Cl.
*H04W 64/00* (2009.01)
*H04W 4/021* (2018.01)
*H04W 4/029* (2018.01)
*H04W 4/50* (2018.01)

(52) U.S. Cl.
CPC .......... *H04W 4/021* (2013.01); *H04W 4/029* (2018.02); *H04W 4/50* (2018.02); *H04W 64/00* (2013.01)

(58) Field of Classification Search
None
See application file for complete search history.

(56) References Cited

U.S. PATENT DOCUMENTS

| | | | |
|---|---|---|---|
| 7,933,611 B2 | 4/2011 | Bocking et al. |
| 8,396,485 B2 | 3/2013 | Grainger et al. |
| 8,504,061 B2 | 8/2013 | Grainger et al. |
| 8,620,344 B2 | 12/2013 | Huang et al. |
| 8,666,388 B2 | 3/2014 | Catovic et al. |
| 8,798,613 B2 | 8/2014 | MacNaughtan et al. |
| 8,838,144 B2 | 9/2014 | Duff et al. |
| 9,418,377 B2 | 8/2016 | Kardell |
| 9,866,995 B2 | 1/2018 | Labrie |
| 10,122,845 B2 | 11/2018 | Ratnakar |
| 10,360,594 B2 | 7/2019 | Ryu et al. |

(Continued)

*Primary Examiner* — Suhail Khan
(74) *Attorney, Agent, or Firm* — Patterson + Sheridan, LLP (57) ABSTRACT

Aspects of the present disclosure provide techniques for efficient location tracking. Embodiments include receiving a device location from a mobile device. Embodiments include identifying a plurality of region definitions and selecting a set of region definitions from the plurality of region definitions based on a proximity of a location of each region definition of the plurality of region definitions to the device location. Embodiments include generating a provisional region definition based on a location of a region definition of the set of region definitions that is farthest from the device location and including the provisional region definition in the set of region definitions. Embodiments include providing the set of region definitions to the mobile device for provisioning and refraining from requesting device locations from the mobile device until receiving a notification from the mobile device that the mobile device has exited a provisional region defined by the provisional region definition.

20 Claims, 5 Drawing Sheets

(56) References Cited

U.S. PATENT DOCUMENTS

| | | |
|---|---|---|
| 10,693,887 B2 | 6/2020 | Saroiu et al. |
| 2007/0105573 A1* | 5/2007 | Gupta .................. H04W 72/20 455/39 |
| 2014/0274145 A1 | 9/2014 | Cronin et al. |
| 2015/0281382 A1 | 10/2015 | Xue et al. |
| 2016/0019592 A1 | 1/2016 | Muttineni et al. |
| 2018/0027064 A1 | 1/2018 | Shibayama et al. |
| 2020/0245095 A1 | 7/2020 | McIntyre et al. |

\* cited by examiner

INTELLIGENT GEOFENCE PROVISIONING

CROSS-REFERENCE TO RELATED APPLICATIONS

This application is a continuation of U.S. patent application Ser. No. 16/256,274, entitled "Intelligent Geofence Provisioning", filed Jan. 24, 2019 and assigned to the assignee hereof, the contents of which are hereby incorporated by reference in its entirety.

INTRODUCTION

Aspects of the present disclosure relate to techniques for efficient location tracking. In particular, embodiments described herein involve limiting a number of provisioned geofences based on proximity to a device's location.

BACKGROUND

Geofences may be virtual perimeters for geographic areas that are used by location-based services to perform tasks related to a user's location. For example, a location-based service associated with a mobile phone may use geolocation to detect the entry into and/or exit from a geofence by a user of the mobile phone. The location-based service may then generate a notification related to the geofence, such as a greeting from a merchant within the geofence and/or an email informing other users of the user's arrival within the geofence. Alternatively, the location-based service may enable and/or disable one or more settings on the mobile phone based on the user's entry into and/or exit from the geofence.

Unfortunately, techniques for utilizing geofences on portable electronic devices may involve high power consumption. For example, a Global Positioning System (GPS) receiver may enable accurate detection of a user's location with respect to a geofence on a mobile phone. But, frequent use of the GPS receiver may increase battery usage on the mobile phone and thereby reduce its runtime.

Moreover, conventional techniques for conserving power while utilizing geofences may result in reduced geofencing accuracy. For example, a mobile phone may detect a user's proximity to geofences based on location updates obtained every 60 seconds from a GPS receiver on the mobile phone. In turn, the mobile phone may reduce power consumption by the GPS receiver by switching the GPS receiver off in between location updates. However, the intermittent nature of the location updates may cause the mobile phone to miss the user's entry into and/or exit from a geofence in between two location updates.

Hence, there is a need for improved techniques for utilizing geofences without excessive power consumption.

BRIEF SUMMARY

Certain embodiments provide a method for efficient location tracking. The method generally includes receiving a device location from a mobile device associated with a user; identifying a plurality of region definitions associated with the user; selecting a set of region definitions from the plurality of region definitions based on a proximity of a location of each region definition of the plurality of region definitions to the device location; generating a provisional region definition based on a particular location of a particular region definition of the set of region definitions that is farthest from the device location; including the provisional region definition in the set of region definitions; providing the set of region definitions to the mobile device for provisioning; and refraining from requesting device locations from the mobile device until receiving a notification from the mobile device that the mobile device has exited a provisional region defined by the provisional region definition.

Other embodiments provide a non-transitory computer-readable medium comprising instructions that, when executed by one or more processors, cause the one or more processors to perform a method for efficient location tracking. The method generally includes receiving a device location from a mobile device associated with a user; identifying a plurality of region definitions associated with the user; selecting a set of region definitions from the plurality of region definitions based on a proximity of a location of each region definition of the plurality of region definitions to the device location; generating a provisional region definition based on a particular location of a particular region definition of the set of region definitions that is farthest from the device location; including the provisional region definition in the set of region definitions; providing the set of region definitions to the mobile device for provisioning; and refraining from requesting device locations from the mobile device until receiving a notification from the mobile device that the mobile device has exited a provisional region defined by the provisional region definition.

Other embodiments provide a system comprising one or more processors and a non-transitory computer-readable medium comprising instructions that, when executed by the one or more processors, cause the one or more processors to perform a method for efficient location tracking. The method generally includes receiving a device location from a mobile device associated with a user; identifying a plurality of region definitions associated with the user; selecting a set of region definitions from the plurality of region definitions based on a proximity of a location of each region definition of the plurality of region definitions to the device location; generating a provisional region definition based on a particular location of a particular region definition of the set of region definitions that is farthest from the device location; including the provisional region definition in the set of region definitions; providing the set of region definitions to the mobile device for provisioning; and refraining from requesting device locations from the mobile device until receiving a notification from the mobile device that the mobile device has exited a provisional region defined by the provisional region definition.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for efficient location tracking.

Techniques described herein relate to region definitions, such as geofences, which are virtual perimeters for geographic areas that may be used by location-based services to perform tasks related to a user's location. Region definitions are generally "provisioned" by registering the region definitions with a platform of a device, such as the device's operating system (OS). The OS may generate events upon determining, such as using a geolocation component of the device, that the device has entered or exited a region defined by a region definition. Location-based services may involve the use of large numbers of region definitions.

For example, a location-based service may track users' travel data for accounting and/or tax purposes. Users of such services may be associated with employers (e.g., ride-share companies or contractors) that have profiles on the services defining a large number of region definitions associated with customer locations or job sites. In one example, a user works for an air conditioning repair company that has a large customer base in a metropolitan area and each customer's building or house is associated with a region definition that defines a circular region surrounding the building or house (e.g., encompassing parking areas). However, certain platforms may only allow a limited number of region definitions to be provisioned at a time. Accordingly, techniques described herein involve selecting a set of region definitions to provision on a device at a given time based on the proximity of the region definitions to the location of the device.

Furthermore, embodiments involve defining a "provisional" region definition encompassing the set of region definitions selected for provisioning (or, in some examples explained below, a subset such as all but one of the set of region definitions selected for provisioning) and including the provisional region definition in the set to be provisioned. As such, a location-based service (e.g., running on a server remote from a mobile device on which the region definitions are provisioned) can receive notifications of events every time the mobile device enters or exits a region defined by a region definition without needing to request the location of the mobile device as long as the mobile device remains within the provisional region definition. Upon receiving a notification of an event indicating that the mobile device has exited the region defined by the provisional region definition, the location-based service can again request the location of the mobile device and select a new set of region definitions for provisioning based on proximity to the location of the mobile device, as well as generate a new provisional region definition. Accordingly, embodiments described herein reduce power consumption and improve the efficiency of location tracking by greatly reducing the frequency with which a device's location must be requested and/or transmitted between computing components while still allowing for location tracking across a large number of region definitions.

Example Computing Environment

Figure 1:
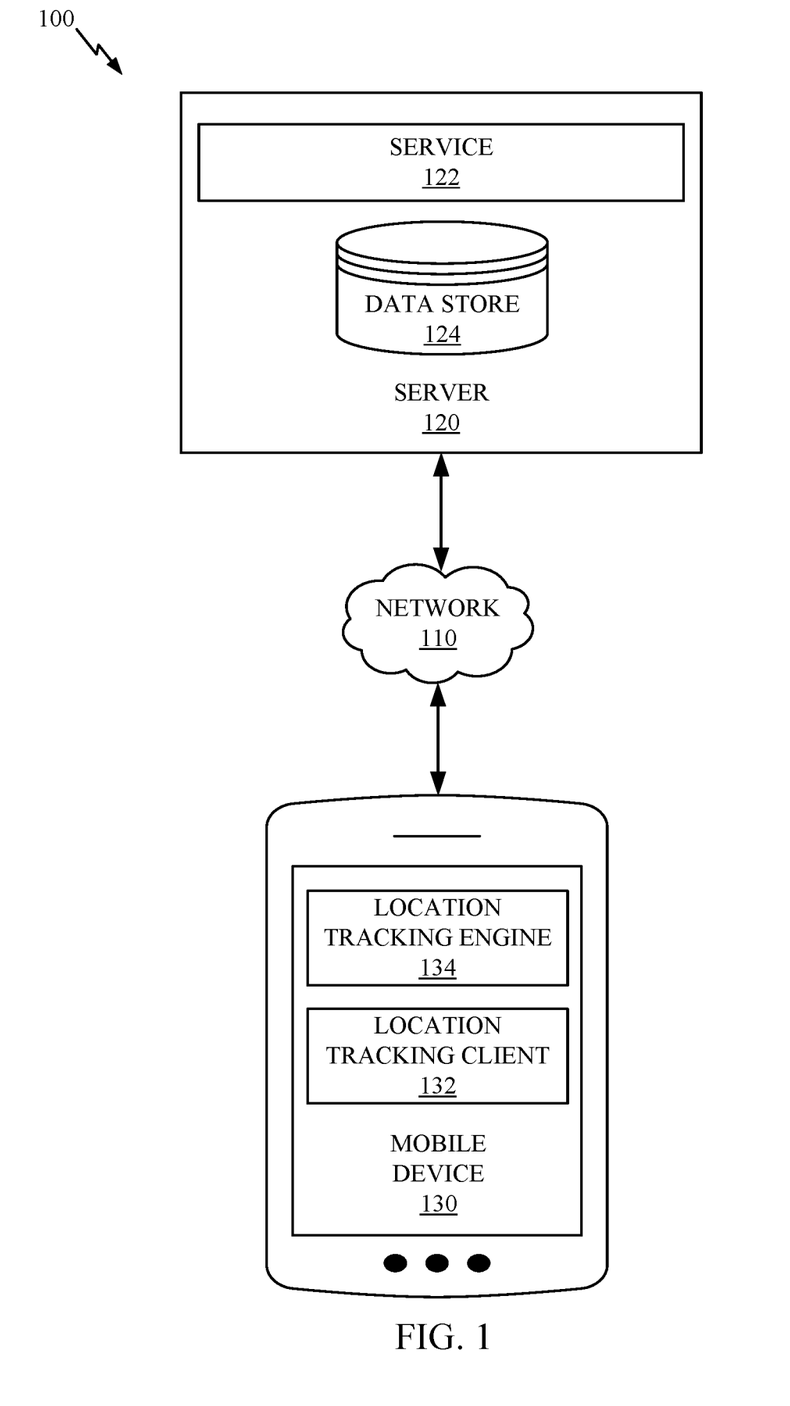
FIG. 1 depicts an example computing environment in which embodiments of the present disclosure may be implemented.

FIG. 1 illustrates an example computing environment 100 in which embodiments of the present disclosure may be implemented.

Computing environment 100 includes a server 120 that communicates with a mobile device 130 over a network 110 in order to enable location tracking.

Server 120 is representative of a computing device, such as a rack server or desktop computer, which provides services to client devices, such as mobile device 130. Server 120 includes a service 122, which may perform operations related to storage and retrieval of data from data store 124, such as in response to requests from components of mobile device 130 (e.g., location tracking engine 134). For instance, service 122 may be a server-side component of a client-server application that is accessed by a user through mobile device 130.

Server 120 further includes data store 124, which represents one or more data storage entities that store data related to location tracking engine 134. In some embodiments, data store 124 stores region definitions for users of location tracking engine 134

A region definition may, for example, comprise a region identifier, coordinates (e.g., a latitude and longitude) of a center point for a region, as well as a radius for the region. While circular region definitions are described herein, it is noted that region definitions may alternatively be polygons. Users generally provide region definitions through a user interface, such as associated with location tracking engine 134. In some embodiments, a user who is responsible for an entity (e.g., a business) provides region definitions that are shared among all users who are associated with the entity (e.g., all employees of the business). Other employees may provide region definitions as well, such as for customer sites that are services by an individual employee. Data store 124 may store mappings between region definitions and entities and/or users.

Mobile device 130 represents a computing device associated with a user (e.g., of location tracking engine 134). For example, mobile device 130 may comprise any form of electronic device capable of running applications, receiving user input, providing output to users, and communicating data over a network interface. In one example, mobile device 130 is a mobile phone (e.g., smartphone), tablet computer, smart wearable device (e.g., watch), or the like. Mobile device 130 comprises a satellite-based location determination capability, such as a Global Positioning System (GPS), Global Navigation Satellite System (GLONASS), or other location-based positioning systems.

Mobile device 130 comprises location tracking client 132 and location tracking engine 134, which perform operations related to location tracking for mobile device 130. In some embodiments, location tracking client 132 is a location service associated with a platform or OS of mobile device 130 while location tracking engine 134 is an application that communicates with service 122 and location tracking client 132 in order to enable techniques for efficient provisioning of region definitions. A user of mobile device 130 may enable a location-based service through a user interface associated with location tracking engine 134 or location tracking client 132, such as by toggling a location tracking option via the user interface. In other embodiments, the user may enable location tracking through an operating system or different application on mobile device 130. In some embodiments, location tracking engine 134 is in communication with service 122 over network 110 for the purposes of storing and retrieving data, such as region definitions stored in data store 124.

A location-based service may involve tracking the user's trips for the purposes of accounting or tax filing. The user may define one or more region definitions and/or may identify an entity with which the user is associated, and the entity may be associated with one or more region definitions (e.g., via mapping data in data store 124). In some embodiments, the user defines a region by entering an address (e.g., including such data as street number, street name, city, state, zip code, and/or country), which location tracking client 132 and/or location tracking engine 134 processes to generate a region definition. Location tracking engine 134 may, for example, generate the region definition based on the address by determining the latitude and longitude of the location identified by the address and determining a radius of a circular region surrounding the location, such as based on a density of addresses in the area or based on other information known about the location (e.g., locations of neighboring addresses and/or locations of parking facilities associated with the location). It is noted that other techniques for determining region definitions are possible, and these are only included as examples. For instance, region definitions need not be circular in all embodiments. In certain embodiments, region definitions are polygons.

In some instances, when a user defined a region for use in generating a region definition, the user provides an identifier (e.g., textual name) of the region definition. The user may also identify whether the region definition is associated with an entity (e.g., business) to which the user belongs or which the user can identify, and/or whether the region definition should be shared with other users (e.g., other users associated with the entity).

When the user enables location tracking on mobile device 130, such as via a user interface associated with location tracking client 132 or location tracking engine 134, operations for efficient location tracking may be initiated. Operations for efficient location tracking are described below with respect to FIGS. 2-5.

Example Exchange of Messages and Illustration of Efficient Location Tracking

Figure 2:
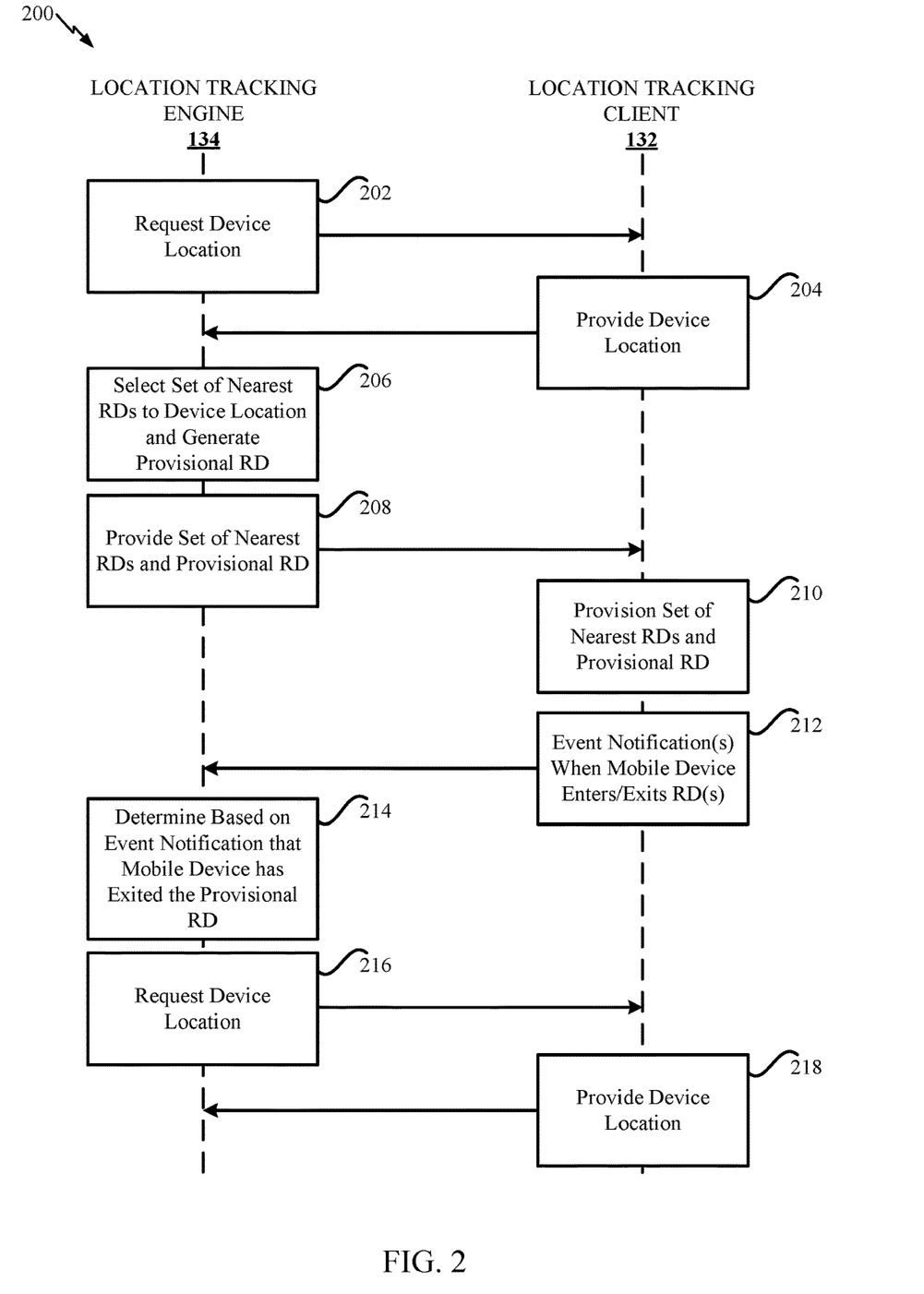
FIG. 2 depicts an example exchange of messages between components related to efficient location tracking.

FIG. 2 depicts an example 200 of an exchange of messages between components related to efficient location tracking, including location tracking engine 134 and location tracking client 132 of FIG. 1. The operation of FIG. 2 is described in conjunction with FIG. 3, which illustrates an example embodiment 300 of efficient location tracking.

At 202, location tracking engine 134 requests a device location from location tracking client 132. For example, a user of mobile device 130 of FIG. 1 may have enabled location tracking via location tracking client 132, which may then notify location tracking engine 134 to begin a process of efficient location tracking, at which point location tracking engine 134 may request the device location from location tracking client 132. Location tracking client 132 may determine the device location using a satellite-based positioning system associated with mobile device 130 of FIG. 1. The device location may comprise coordinates, such as a latitude and longitude, at which the device is presently located. For instance, the device location of mobile device 130 is depicted at device location 362 in FIG. 3.

At 204, location tracking client 132 provides the device location to location tracking engine 134. At 206, location tracking engine 134 selects a set of nearest region definitions (referred to as RDs in FIG. 2) to the device location and generates a provisional region definition (generation of the provisional region definition is described in detail below with respect to provisional region definition 360 of FIG. 3). In some embodiments, location tracking engine 134 retrieves all region definitions associated with the user and/or any entities (e.g., employers or groups) to which the user belongs by sending a request (e.g., including a user identifier of the user) to service 122 of FIG. 1, and service 122 may retrieve all region definitions associated with the user and/or entities from data store 124 of FIG. 1 and return the region definitions to location tracking engine 134.

In one example, mobile device 130 may only allow for five region definitions to be provisioned at a time. Five is only included as an example for illustration purposes, and devices may support provisioning of a variety of different numbers of region definitions at a time. In one example, location tracking engine 134 identifies all region definitions associated with the user and/or with an entity (or entities) to which the user belongs (e.g., by retrieving the region definitions from data store 124 via service 122) and then selects a set of region definitions that are in closest proximity to the device location for provisioning.

Service 122 of FIG. 1 may identify all region definitions associated with a user and/or entity by accessing mapping information stored in data store 124 of FIG. 1 and determining mapping between region definitions and the user and/or entity. Service 122 may determine that a user is associated with an entity based, for example, on profile information for the user, which may also be stored in data store 124 of FIG. 1 or in some other local or remote location. In an embodiment, location tracking engine 134 receives region definitions from service 122 and then compares the latitude and longitude of the center point of each region definition to the latitude and longitude of the device location in order to identify which region definitions are closest to the device location. In an embodiment where mobile device 130 only allows five region definitions to be provisioned at a time, location tracking engine 134 selects the four region definitions that are closest to the device location for provisioning, and then generates a provisional region definition to be provisioned to reach a total of five provisioned region definitions. In general, location tracking engine 134 may be configured to select one less than the number of region definitions that can be provisioned at a time in order to leave one spot for the provisional region definition. For example, location tracking engine 134 may select region definitions 320, 330, 340, and 350 of FIG. 3 for inclusion in the set of region definitions to be provisioned based on proximity to device location 362. Each of region definitions 320, 330, 340, and 350 has a center point 322, 332, 342, and 352 and a radius 324, 334, 344, and 354. While not shown, additional region definitions (e.g., located farther away from device location 362) may not be selected.

Figure 3:
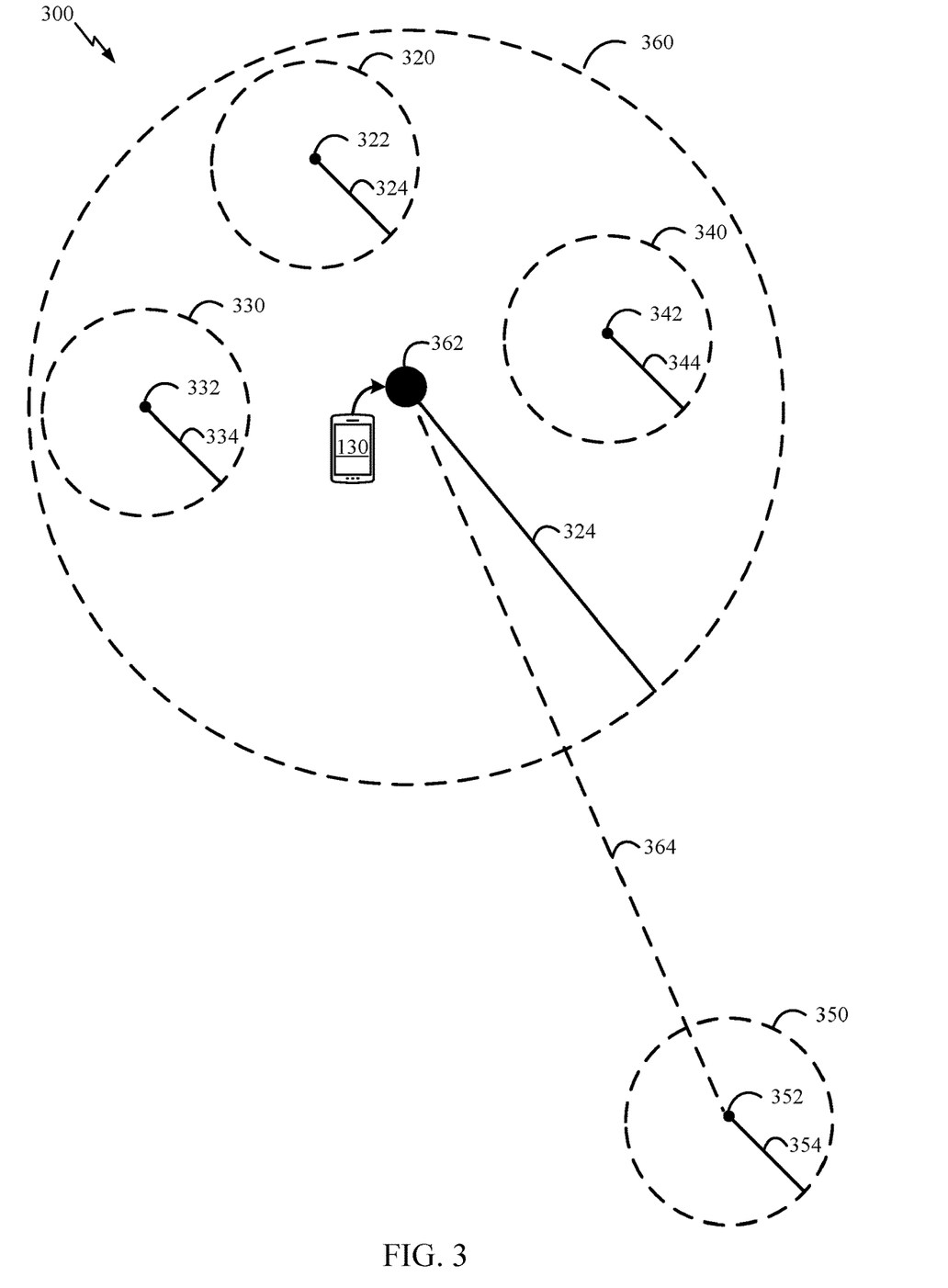
FIG. 3 depicts an example embodiment of efficient location tracking.

Location tracking engine 134 generates the provisional region definition based on the locations of the selected region definitions (e.g., the locations of the center points of the region definitions). For example, as shown in FIG. 3, location tracking engine 134 generates provisional region definition 360 by defining a center point to be device location 362 and a radius 324 to be half of the distance 364 between device location 362 and the center point 352 of region definition 350, which is the farthest region definition of those selected from device location 362. The reason that radius 324 is defined to be half of the distance between device location 362 and center point 352 of region definition 350 is so that when mobile device 130 exits provisional region definition 360, location tracking engine 134 might have a window of time to select a new set of region definitions for provisioning and generate a new provisional region definition before mobile device 130 potentially reaches region definition 350. As such, gaps in location tracking are avoided while still performing efficient location tracking techniques described herein. Defining the radius of a provisional region definition to be half of the distance between the device location and the farthest provisioned region definition is only included as an example, and alternative methods of defining provisional region definition 360 are possible.

It is noted that radius 324 of provisional region definition 360 may alternatively be defined differently, such as to encompass all of the selected region definitions 320, 330, 340, and 350, or to encompass a larger amount of the distance 364 between device location 362 and center point 352 of region definition 350. In alternative embodiments, if the distance 364 between device location 362 and the center point 352 of the farthest region definition 250 is less than a threshold, radius 324 is defined to encompass all of region definitions 320, 330, 340, and 350. Location tracking engine 134 may include provisional region definition 360 in the set of region definitions to provision.

At 208, location tracking engine 134 provides the set of nearest region definitions (e.g., selected at 206) and the provision region definition to location tracking client 132 for provisioning. For example, region definitions 320, 330, 340, and 350 and provisional region definition 360 of FIG. 3 may be included in a set of region definitions provided to location tracking client 132 for provisioning.

At 210, location tracking client 132 provisions the set of region definitions provided at 208 by location tracking engine 134. For example, location tracking client 132 may provision region definitions 320, 330, 340, and 350 and provisional region definition 360 by registering them with an OS of mobile device 130. Location tracking client 360 may, for instance, use methods of an application programming interface (API) and/or software development kit (SDK) of the OS to register the region definitions. The OS may then track the device location to determine when mobile device 130 enters or exits any of the provisioned region definitions, and location tracking engine 134 will conserve resources, such as power on mobile device 130, and improve efficiency by refraining from requesting the device location after determining that mobile device 130 has entered provisional region definition 360 and until receiving an event notification that mobile device 130 has exited provisional region definition 360.

At 212, location tracking client 132 provides any event notification(s) (e.g., generated by the OS) to location tracking engine 134 indicating when mobile device 130 enters or exits any of the provisioned region definitions 320, 330, 340, 350, and 360. Event notification(s) may, for instance, comprise an identifier of a region definition and an indication of whether mobile device 130 has entered or exited the region defined by the region definition.

At 214, location tracking engine 134 determines based on an event notification that mobile device 130 has exited the provisional region definition. For example, location tracking engine 134 may receive an event notification from location tracking client 132 at 210 comprising the identifier of provisional region definition 360 and an indication that mobile device 300 has exited the region. As such, location tracking engine 134 determines based on this notification (e.g., using region definition identifiers stored in data store 124 of FIG. 1) that mobile device 130 has exited provisional region definition 360. At this point, location tracking engine 134 may request an updated device location and select an updated set of region definitions for provisioning, as well as generate a new provisional region definition.

At 216, location tracking engine 134 requests an updated device location of mobile device 130 from location tracking client 132.

At 218, location tracking engine 132 provides an updated device location of mobile device 130 to location tracking engine 134. Location tracking engine 134 may then select an updated set of region definitions for provisioning and generate a new provisional region definition (e.g., as described above with respect to 206).

Thus location tracking engine 134 is able to perform accurate location tracking across a large number of region definitions regardless of how many region definitions can be provisioned at a time on mobile device 130, and without requiring frequent requests for the device location. Avoiding frequent requests for the device location from mobile device 130 saves power, processing and communication resources, which is particularly beneficial for mobile device 130. As mobile device 130 moves over time, the nearest set of region definitions continues to be provisioned in order to ensure consistent location tracking. As such, location tracking engine 134 is able to determine when the user enters and exits different locations of interest and provide location-based services accordingly.

In one example, location tracking engine 134 records all entrances and exits from region definitions for accounting and/or tax filing purposes. The user may, for instance, be able to deduct costs associated with business-related trips for taxation purposes or may bill costs associated with business-related trips to an employer or customer. Efficiently tracking when the user enters and exits locations of interest (e.g., customer locations or job sites) enables these location-based services to be provided.

In another example, users may be provided with targeted content based on location tracking. For instance, a greeting from a merchant within a region and/or a message informing other users of the user's arrival within the region may be provided based on the efficient location tracking described herein. It is noted that many other types of location-based services may be provided according to embodiments of the present disclosure.

It is noted that while embodiments described herein involve exchanges of data and requests between particular components, alternative arrangements are possible. For example, certain functionality described herein as being performed by location tracking engine 134 and/or location tracking client 132 may alternatively be performed as part of a larger application or at the request of an application.

Example Method

Figure 4:
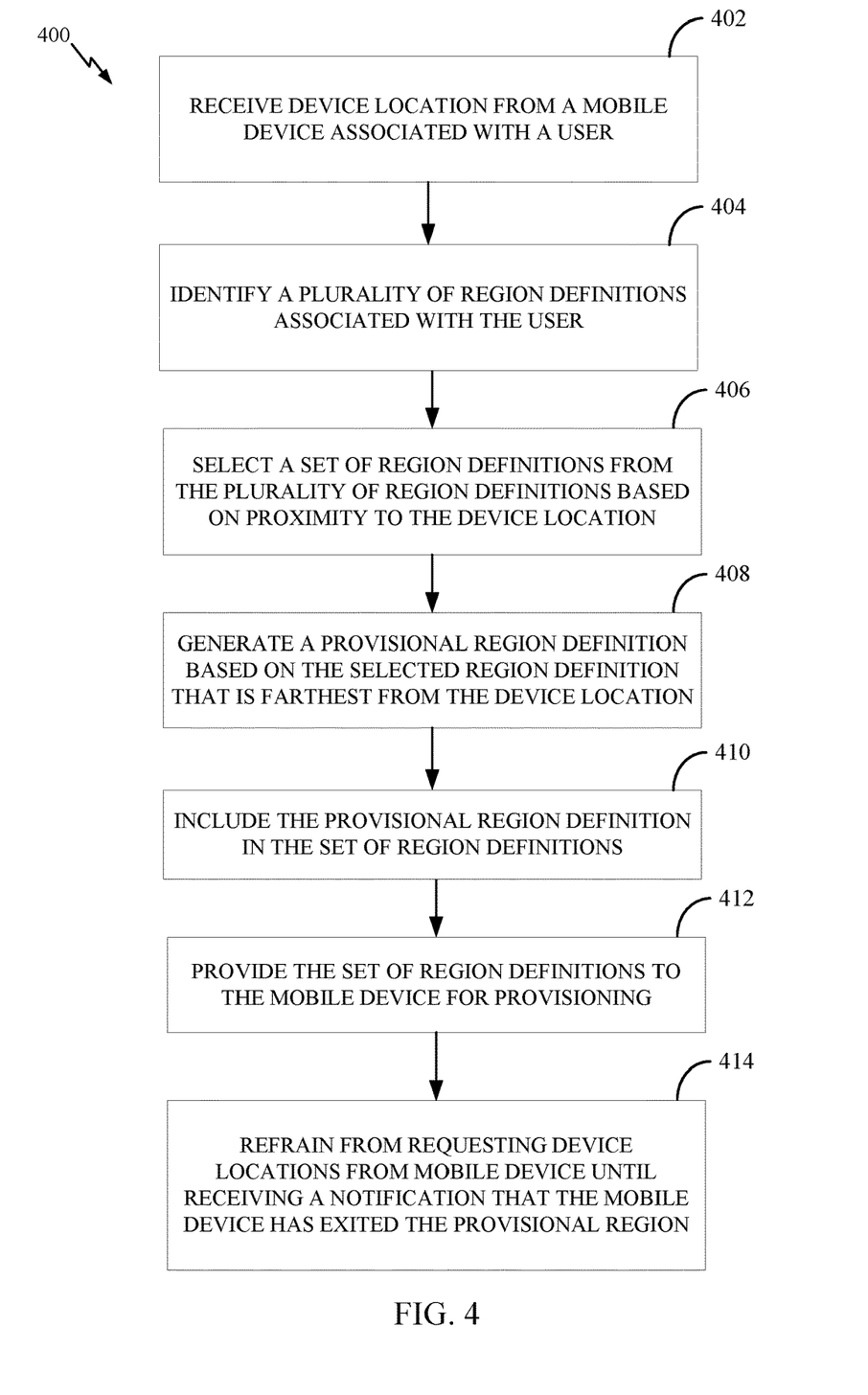
FIG. 4 depicts example operations for efficient location tracking.

FIG. 4 depicts example operations 400 for efficient location tracking. For example, operations 400 may be performed by location tracking engine 134 of FIG. 1.

At step 402, a device location is received from a mobile device associated with a user. For example, the device location may be received from the mobile device (e.g., in response to a request from location tracking engine 134 of FIG. 1) as a set of coordinates (e.g., latitude and longitude), an address, a network (e.g., IP) address, and/or another set of attributes that may be used to locate the user. In some embodiments, additional processing may be performed to determine the device location, such as by providing a received IP address to a geolocation service that outputs additional data related to the device location, such as an address or coordinates.

At step 404 a plurality of region definitions associated with the user are identified. For example, location tracking engine 134 may send a request to service 122 of FIG. 1, which may access mapping information in data store 124 of FIG. 1 in order to identify region definitions associated with the user. In certain embodiments, location tracking engine 134 (e.g., via service 122 of FIG. 1) determines that the user is associated with an entity, such as by accessing profile information associated with the user in data store 124 of FIG. 1, and identifies region definitions associated with the entity in the mapping information. The plurality of region definitions may include all region definitions defined by the user and/or an entity with which the user is associated (e.g., representing all customer locations and/or jobs sites associated with the user's business).

At step 406, a set of region definitions is selected from the plurality of region definitions identified at step 404 based on proximity to the device location received at 402. For example, location tracking engine 134 may compare coordinates of a center point of each region definition of the plurality of region definitions to coordinates of the device location in order to identify the region definitions that are closest to the device location. The set may be comprised of one less than the total number of region definitions which can be provisioned on the mobile device at a time. For instance, location tracking engine 134 may determine a maximum number of region definitions that can be provisioned at a time on the mobile device (e.g., by requesting the maximum number from location tracking client 132, which may retrieve the maximum number from the OS of the mobile device, or based on predetermined information, such as stored in data store 124 of FIG. 1). Location tracking engine 134 may then choose a number of region definitions to include in the set based on the maximum number of region definitions that can be provisioned at a time on the mobile device.

At step 408, a provisional region definition is generated based on the region definition selected at step 406 that is farthest from the device location. For example, location tracking engine 134 may define a center point of the provisional region definition to be the coordinates of the device location. Location tracking engine 134 may determine which region definition of the set selected at step 406 is farthest from the device location, and may define a radius of the provisional region definition based on a distance from the device location to a center point of the region definition that is farthest from the device location. In one example, the radius of the provisional region definition is defined to be half of the distance from the device location to the center point of the farthest region definition of the set of region definitions.

At step 410, the provisional region definition is included in the set of region definitions determined at step 406 for provisioning.

At step 412, the set of region definitions, including the provisional region definition, is provided to the mobile device for provisioning. For example, location tracking engine 134 may provide the set of region definitions to location tracking client 132 of FIG. 1, which may provision the set of region definitions by registering them with an OS of the mobile device.

At step 414, device locations are not requested from the mobile device until a notification is received that the mobile device has exited the provisional region defined by the provisional region definition. For example, location tracking engine 134 may refrain from sending any requests to location tracking client 132 for the device location (and may also thereby refrain from performing any calculations or processing related to determining the device location, such as based on an address or IP address) as long as the mobile device remains within the provisional region.

Upon receiving a notification that the mobile device has exited the provisional region definition, location tracking engine 134 may request an updated device location from location tracking client 132 and select an updated set of region definitions for provisioning based on proximity to the updated device location (e.g. as described with respect to step 406). Furthermore, location tracking engine 134 may then generate an updated provisional region definition based on the updated set (e.g., as described with respect to step 408) and include the updated provisional region definition in the updated set for provisioning.

It is noted that when an updated set of region definitions is selected for provisioning, the updated set may include some region definitions that were in the original set as well as some region definition that were not in the original set. Because region definitions that were in the original set are already provisioned on the mobile device, these will not need to be re-provisioned. As such, location tracking client 132 may de-provision any region definitions that were previously provisioned but were not included in the updated set and provision any new region definitions that were not previously provisioned but were included in the updated set.

In some examples, an apparatus, including a memory comprising executable instructions and a processor in data communication with the memory and configured to execute the executable instructions, may be configured to cause the apparatus to perform a method for efficient location tracking, such as method 400 (or any combination of the steps described above with respect to method 400).

In some examples, a non-transitory computer-readable medium comprises instructions that, when executed by a processor of an apparatus, cause the apparatus to perform a method for efficient location tracking, such as method 400 (or any combination of the steps described above with respect to method 400).

Example Computing System

Figure 5A:
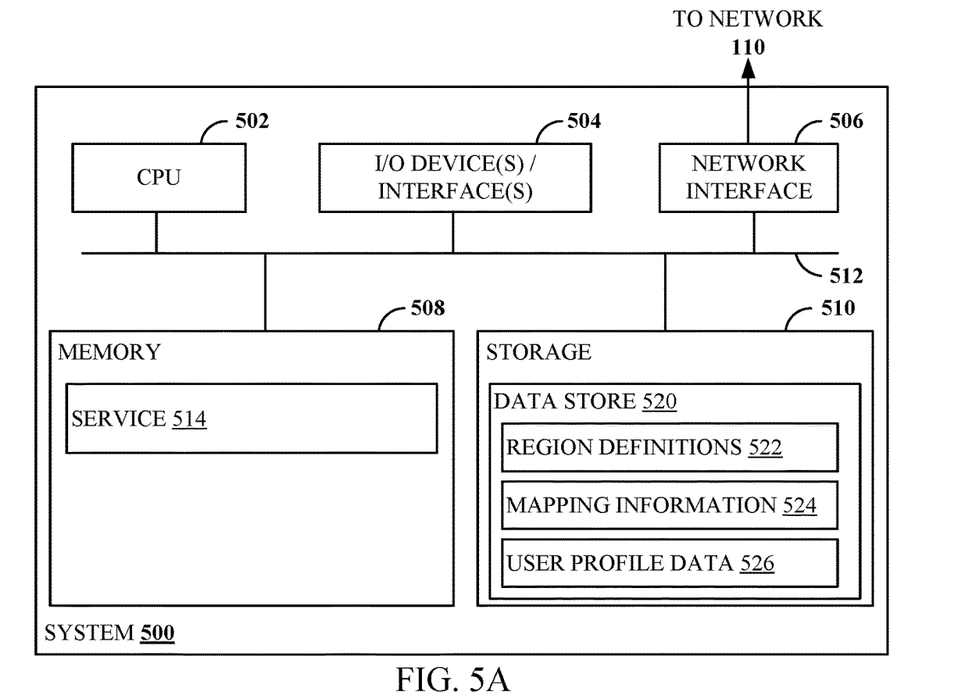
FIGS. 5A and 5B depict example computer systems with which embodiments of the present disclosure may be implemented.

FIG. 5A illustrates an example system 500 used for efficient location tracking. For example, system 500 may be representative of server 120 of FIG. 1.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network 110. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements.

Additionally, the memory 508 is included to be representative of a random access memory.

Storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises data store 520, which may be representative of data store 124 of FIG. 1. While data store 520 is depicted in local storage of system 500, it is noted that data store 520 may also be located remotely (e.g., at a location accessible over a network, such as the Internet). Data store 520 includes region definitions 522 (e.g., each comprising an identifier, coordinates of a center point, and a radius), mapping information 524 (e.g., comprising mapping between region definition identifiers and users or entities), and user profile data 526 (e.g., including data related to users of location tracking engine 514, such as entities with which users are associated).

As shown, memory 508 includes service 514, which may be representative of service 122 of FIG. 1.

Figure 5B:
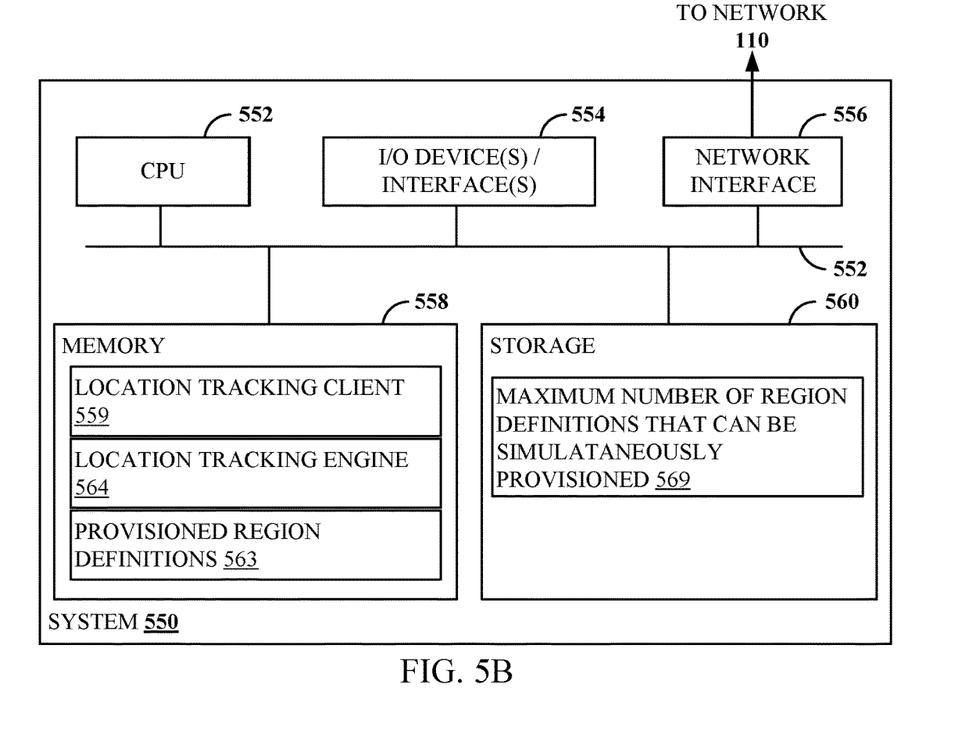

FIG. 5B illustrates an example system 550 used for efficient location tracking. For example, system 550 may be representative of mobile device 130 of FIG. 1.

System 550 includes a central processing unit (CPU) 552, one or more I/O device interfaces 554 that may allow for the connection of various I/O devices 554 (e.g., keyboards, displays, mouse devices, pen input, satellite-based positioning devices etc.) to the system 550, network interface 556, a memory 558, storage 560, and an interconnect 552. It is contemplated that one or more components of system 550 may be located remotely and accessed via a network 110. It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 552 transmits programming instructions and application data, among the CPU 552, I/O device interface 554, network interface 556, memory 558, and storage 560. CPU 552 is included to be representative of a single CPU, multiple CPUs, a single CPU having multiple processing cores, and other arrangements.

Additionally, the memory 558 is included to be representative of a random access memory. As shown, memory 558 includes location tracking client 559 and location tracking engine 564, which may be representative of location tracking client 132 and location tracking engine 134 of FIG. 1. Memory 558 further includes provisioned region definitions 563, which comprise a set of region definitions currently provisioned on system 550. In certain embodiments provisioned region definitions 563 includes a provisional region definition as described herein.

Storage 560 may be a disk drive, solid state drive, or a collection of storage devices distributed across multiple storage systems. Although shown as a single unit, the storage 560 may be a combination of fixed and/or removable storage devices, such as fixed disc drives, removable memory cards or optical storage, network attached storage (NAS), or a storage area-network (SAN). As shown, storage 560 includes a maximum number of region definitions that can be simultaneously provisioned 569, which may be representative of a number of region definitions that an OS of system 550 allows to be provisioned at a time.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    transmitting, to a location tracking engine, a geographic location of a mobile device;
    receiving, from the location tracking engine, a set of region definitions, wherein at least one region definition in the set of region definitions comprises a provisional regional definition defined based on a region definition in the set of region definitions farthest from the geographic location of the mobile device;
    refraining from reporting subsequent geographic locations for the mobile device while the mobile device is located within a region defined by the provisional region definition;

determining that the mobile device has entered a region defined by at least one region definition in the set of region definitions and that the mobile device has exited the region defined by the provisional region definition;
transmitting, to the location tracking engine, an event notification including an identifier in the set of region definitions and an indicator that the mobile device has entered the region defined by at least one region definition in the set of region definitions;
receiving, from the location tracking engine, a request for an updated geographic location of the mobile device; and
transmitting, to the location tracking engine, a response including the updated geographic location of the mobile device.

2. The method of claim 1, wherein the provisional region definition is defined further based on a radius half a distance from the geographic location of the mobile device to the location of the region definition farthest from the geographic location of the mobile device.

3. The method of claim 2, wherein the provisional region definition excludes regions further than the radius from the geographic location of the mobile device.

4. The method of claim 2, wherein:
the geographic location of the mobile device comprises a device latitude and a device longitude; and
the provisional region definition is centered on the device latitude and the device longitude.

5. The method of claim 1, wherein a number of region definitions in the set of region definitions is based on a maximum number of region definitions that can be provisioned on the mobile device.

6. The method of claim 1, wherein the set of region definitions comprises region definitions associated with an entity to which a user of the mobile device belongs.

7. The method of claim 1, further comprising:
receiving, from the location tracking engine, an updated set of region definitions,
wherein the updated set of region definitions comprises one or more regions selected based on an updated proximity of a location of each of a plurality of region definitions to the updated geographic location of the mobile device.

8. The method of claim 1, further comprising:
recording an entry time at which the mobile device has entered a provisional region defined by the provisional region definition and an exit time at which the mobile device has exited the provisional region; and
committing, to a data repository, a record including a distance traversed between the entry time and the exit time.

9. The method of claim 1, further comprising:
receiving, from a remote service, first content after transmitting, to the location tracking engine, the geographic location of the mobile device; and
receiving, from the remote service, second content after transmitting, to the location tracking engine, the updated geographic location of the mobile device,
wherein the first content comprises location-based content associated with the geographic location of the mobile device, and
wherein the second content comprises location-based content associated with the updated geographic location of the mobile device.

10. A system, comprising:
a memory having executable instructions stored thereon; and
a processor configured to execute the executable instructions to:
transmit, to a location tracking engine, a geographic location of a mobile device;
receive, from the location tracking engine, a set of region definitions, wherein at least one region definition in the set of region definitions comprises a provisional regional definition defined based on a region definition in the set of region definitions farthest from the geographic location of the mobile device;
refrain from reporting subsequent geographic locations for the mobile device while the mobile device is located within a region defined by the provisional region definition;
determine that the mobile device has entered a region defined by at least one region definition in the set of region definitions and that the mobile device has exited the region defined by the provisional region definition;
transmit, to the location tracking engine, an event notification including an identifier in the set of region definitions and an indicator that the mobile device has entered the region defined by at least one region definition in the set of region definitions;
receive, from the location tracking engine, a request for an updated geographic location of the mobile device; and
transmit, to the location tracking engine, a response including the updated geographic location of the mobile device.

11. The system of claim 10, wherein the provisional region definition is defined further based on a radius half a distance from the geographic location of the mobile device to the location of the region definition farthest from the geographic location of the mobile device.

12. The system of claim 11, wherein the provisional region definition excludes regions further than the radius from the geographic location of the mobile device.

13. The system of claim 11, wherein:
the geographic location of the mobile device comprises a device latitude and a device longitude; and
the provisional region definition is centered on the device latitude and the device longitude.

14. The system of claim 10, wherein a number of region definitions in the set of region definitions is based on a maximum number of region definitions that can be provisioned on the mobile device.

15. The system of claim 10, wherein the set of region definitions comprises region definitions associated with an entity to which a user of the mobile device belongs.

16. The system of claim 10, wherein the processor is further configured to:
receive, from the location tracking engine, an updated set of region definitions,
wherein the updated set of region definitions comprises one or more regions selected based on an updated proximity of a location of each of a plurality of region definitions to the updated geographic location of the mobile device.

17. The system of claim 10, wherein the processor is further configured to:
record an entry time at which the mobile device has entered a provisional region defined by the provisional region definition and an exit time at which the mobile device has exited the provisional region; and commit, to a data repository, a record including a distance traversed between the entry time and the exit time.

18. The system of claim 10, wherein the processor is further configured to:

receive, from a remote service, first content after transmitting, to the location tracking engine, the geographic location of the mobile device; and receive, from the remote service, second content after transmitting, to the location tracking engine, the updated geographic location of the mobile device, wherein the first content comprises location-based content associated with the geographic location of the mobile device, and wherein the second content comprises location-based content associated with the updated geographic location of the mobile device.

19. A method, comprising:

transmitting, to a location tracking engine, a geographic location of a mobile device;

receiving, from the location tracking engine, a set of region definitions, wherein at least one region definition in the set of region definitions comprises a provisional regional definition defined based on a region definition in the set of region definitions farthest from the geographic location of the mobile device;

refraining from reporting subsequent geographic locations for the mobile device while the mobile device is located within a region defined by the provisional region definition;

determining that the mobile device has entered a region defined by at least one region definition in the set of region definitions and that the mobile device has exited the region defined by the provisional region definition;

transmitting, to the location tracking engine, an event notification including an identifier in the set of region definitions and an indicator that the mobile device has entered the region defined by at least one region definition in the set of region definitions;

receiving, from the location tracking engine, a request for an updated geographic location of the mobile device;

transmitting, to the location tracking engine, a response including the updated geographic location of the mobile device;

recording an entry time at which the mobile device has entered a provisional region defined by the provisional region definition and an exit time at which the mobile device has exited the provisional region; and committing, to a data repository, a record including a distance traversed between the entry time and the exit time.

20. The method of claim 19, further comprising:

receiving, from a remote service, first content after transmitting, to the location tracking engine, the geographic location of the mobile device; and receiving, from the remote service, second content after transmitting, to the location tracking engine, the updated geographic location of the mobile device, wherein the first content comprises location-based content associated with the geographic location of the mobile device, and wherein the second content comprises location-based content associated with the updated geographic location of the mobile device.

* * * * *